United States Patent
Guo et al.

(10) Patent No.: US 10,991,333 B2
(45) Date of Patent: Apr. 27, 2021

(54) MEMORY-IN-PIXEL CIRCUIT AND DRIVING METHOD THEREOF, AND LIQUID CRYSTAL DISPLAY PANEL INCLUDING THE SAME

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Wang Guo, Beijing (CN); Yue Li, Beijing (CN); Yanchen Li, Beijing (CN); Mingyang Lv, Beijing (CN); Yu Zhao, Beijing (CN); Dawei Feng, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/675,275

(22) Filed: Nov. 6, 2019

(65) Prior Publication Data
US 2020/0160806 A1 May 21, 2020

(30) Foreign Application Priority Data
Nov. 16, 2018 (CN) .......................... 201811367862.2

(51) Int. Cl.
*G09G 3/36* (2006.01)
*G02F 1/1362* (2006.01)

(52) U.S. Cl.
CPC ..... *G09G 3/3688* (2013.01); *G02F 1/136213* (2013.01)

(58) Field of Classification Search
CPC ......... G09G 3/3688; G09G 2300/0857; G09G 2310/0281; G09G 3/3648; G02F 1/136213
See application file for complete search history.

(56) References Cited

U.S. PATENT DOCUMENTS 5,461,593 A * 10/1995 Kim .................... G11C 8/08
                                             365/230.06
5,945,972 A * 8/1999 Okumura ............. G09G 3/3648
                                             345/100

(Continued)

FOREIGN PATENT DOCUMENTS

| CN | 104900210 | 9/2015 |
|----|-----------|--------|
| CN | 106169288 | 11/2016 |

(Continued)

OTHER PUBLICATIONS

Office action from Chinese Application No. 201811367862.2 dated Jul. 3, 2020.

*Primary Examiner* — Grant Sitta
(74) *Attorney, Agent, or Firm* — Calfee, Halter & Griswold LLP (57) ABSTRACT

A memory in-pixel (MIP) circuit, a driving method of the MIP circuit, and an LCD panel fabricated using the MIP circuit. The MIP circuit comprising an input circuit, a control circuit and an output circuit. The input circuit brings the first input terminal and the second input terminal into conduction with a first node and a second node respectively in response to the first control signal of the first control terminal being active. The control circuit is configured to set and maintain the potential of a third node or a fourth node active based on the potential of the first node and the second node. The output circuit is configured to bring the output terminal into conduction with the first or second input terminal according to the potential of the third and the fourth (Continued)

node in response to the second control signal of the second control terminal being active.

16 Claims, 7 Drawing Sheets

(56) References Cited

U.S. PATENT DOCUMENTS

| | | | | |
|---|---|---|---|---|
| 9,041,694 | B2* | 5/2015 | Nurmi | G09G 3/3648 345/204 |
| 9,235,047 | B2* | 1/2016 | Miyamoto | G09G 3/346 |
| 10,147,367 | B2* | 12/2018 | Tan | G02F 1/13306 |
| 10,832,608 | B2* | 11/2020 | Guo | G09G 3/344 |
| 2005/0157539 | A1* | 7/2005 | Van Der Zaag | G11C 11/16 365/158 |
| 2007/0159417 | A1* | 7/2007 | Miyake | G09G 3/3258 345/76 |
| 2009/0146991 | A1* | 6/2009 | Shimodaira | G06F 3/03545 345/214 |
| 2009/0153546 | A1* | 6/2009 | Senda | G09G 3/3283 345/214 |
| 2012/0313104 | A1* | 12/2012 | Liu | H01L 33/08 257/71 |
| 2013/0002626 | A1* | 1/2013 | Washio | G09G 3/2085 345/205 |
| 2013/0229403 | A1* | 9/2013 | Teranishi | G09G 3/3648 345/212 |
| 2015/0097792 | A1* | 4/2015 | Yoshida | G06F 3/04883 345/173 |
| 2016/0071493 | A1* | 3/2016 | Yoshiga | G09G 3/3648 345/213 |
| 2017/0148392 | A1* | 5/2017 | Kim | G11C 19/287 |
| 2017/0163146 | A1* | 6/2017 | Suzuki | G11C 16/30 |
| 2018/0047360 | A1* | 2/2018 | Cai | G09G 3/3677 |
| 2018/0211615 | A1 | 7/2018 | Tan | |
| 2018/0218706 | A1 | 8/2018 | Gong | |
| 2019/0096354 | A1* | 3/2019 | Chen | G02F 1/13306 |
| 2019/0206301 | A1 | 7/2019 | Wang et al. | |
| 2019/0287459 | A1 | 9/2019 | Liu et al. | |
| 2020/0004070 | A1* | 1/2020 | Gu | G09G 3/3659 |
| 2020/0265763 | A1* | 8/2020 | Shang | G09G 3/20 |

FOREIGN PATENT DOCUMENTS

| | | | |
|---|---|---|---|
| CN | 106297686 | | 9/2017 |
| CN | 107919101 | | 4/2018 |
| CN | 107945763 | | 4/2018 |
| CN | 108389548 | | 8/2018 |
| CN | 108630166 | | 10/2018 |
| WO | 2012166941 | | 12/2012 |
| WO | WO-2017197992 A1 * | 11/2017 | ........... G02F 1/1343 |

* cited by examiner

MEMORY-IN-PIXEL CIRCUIT AND DRIVING METHOD THEREOF, AND LIQUID CRYSTAL DISPLAY PANEL INCLUDING THE SAME

RELATED APPLICATIONS

The present application claims the benefit of Chinese Patent Application No. 201811367862.2, filed on Nov. 16, 2018 with the China National Intellectual Property Administration, the entire disclosure of which is incorporated herein by reference.

TECHNICAL FIELD

The present disclosure relates to the field of display technologies, and more particularly to a memory-in-pixel (MIP) circuit and a driving method thereof, and a liquid crystal display (LCD) panel including the MIP circuit.

BACKGROUND

At present, with the constant development of display technologies, people have set higher requirements for the ultra-low power consumption of LCD display technologies. As a new type of low-power consumption LCD display technology, the MIP display technology has a very broad development prospect due to its advantages of e.g. no change of the structure of LCDs, no need of developing new materials and simple structure.

MIP circuitry disclosed in the prior art is, however, composed of a CMOS circuit so that the manufacturing process of MIPs is complicated, which increases the manufacturing difficulty and cost of MIPs.

SUMMARY

According to an exemplary embodiment, there is provided an MIP circuit comprising: a first voltage terminal configured to receive a first voltage signal; a second voltage terminal configured to receive a second voltage signal; a first input terminal configured to receive a first input signal; a second input terminal configured to receive a second input signal; a first control terminal configured to receive a first control signal; and a second control terminal configured to receive a second control signal; an output terminal configured to output an output signal; an input circuit configured to: in response to the first control signal being active, bring the first input terminal into conduction with a first node, and bring the second input terminal into conduction with a second node; a control circuit configured to: set the potential of a third node based on the potential of the first node, and set the potential of a fourth node based on the potential of the second node, so as to make the third node or the fourth node at an active potential, and maintain the potentials of the third node and the fourth node; and an output circuit configured to: in response to the second control signal being active and the third node being at an active potential, bring the first input terminal into conduction with the output terminal, and in response to the second control signal being active and the fourth node being at an active potential, bring the second input terminal into conduction with the output terminal.

According to an exemplary embodiment, the input circuit comprises: a first transistor having a control electrode connected with the first control terminal, a first electrode connected with the first input terminal, and a second electrode connected with the first node; and a second transistor having a control electrode connected with the first control terminal, a first electrode connected with the second input terminal, and a second electrode connected with the second node.

According to an exemplary embodiment, the control circuit comprises: a first control sub-circuit configured to: in response to the first node being at an active potential, make the third node at an inactive potential, and in response to the first node being at an inactive potential, make the third node at an active potential, and maintain the potential of the third node; and a second control sub-circuit configured to: in response to the second node being at an active potential, make the fourth node at an inactive potential, and in response to the second node being at an inactive potential, make the fourth node at an active potential, and maintain the potential of the fourth node.

According to an exemplary embodiment, the first control sub-circuit is comprises: a third transistor having a control electrode and a first electrode connected with the first voltage terminal, and a second electrode connected with the third node; a fifth transistor having a control electrode connected with the fourth node, a first electrode connected with the third node, a second electrode connected with the second voltage terminal; and a seventh transistor having a control electrode connected with the first node, a first electrode connected with the third node, and a second electrode connected with the second voltage terminal.

According to an exemplary embodiment, the first control sub-circuit further comprises a first capacitor having a first electrode connected with the first node and a second electrode connected with the second voltage terminal.

According to an exemplary embodiment, the first control sub-circuit comprises: a third transistor having a control electrode and a first electrode connected with the first voltage terminal, and a second electrode connected with the third node; a seventh transistor having a control electrode connected with the first node, a first electrode connected with the third node, and a second electrode connected with the second voltage terminal; and a first capacitor having a first electrode connected with the first node, and a second electrode connected with the second voltage terminal.

According to an exemplary embodiment, the second control sub-circuit comprises: a fourth transistor having a control electrode and a first electrode connected with the first voltage terminal, and a second electrode connected with the fourth node; a sixth transistor having a control electrode connected with the third node, a first electrode connected with the fourth node, and a second electrode connected with the second voltage terminal; and an eighth transistor having a control electrode connected with the second node, a first electrode connected with the fourth node, and a second electrode connected with the second voltage terminal.

According to an exemplary embodiment, the second control sub-circuit further comprises a second capacitor having a first electrode connected with the second node and a second electrode connected with the second voltage terminal.

According to an exemplary embodiment, the second control sub-circuit comprises: a fourth transistor having a control electrode and a first electrode connected with the first voltage terminal, and a second electrode connected with the fourth node; an eighth transistor having a control electrode connected with the second node, a first electrode connected with the fourth node, and a second electrode connected with the second voltage terminal; and a second capacitor having a first electrode connected with the second node, and a second electrode connected with the second voltage terminal.

According to an exemplary embodiment, the output circuit comprises: a ninth transistor having a control electrode connected with the third node, and a first electrode connected with the first input terminal; a tenth transistor having a control electrode connected with the fourth node, and a first electrode connected with the second input terminal; an eleventh transistor having a control electrode connected with the second control terminal, and a second electrode connected with the output terminal; wherein a second electrode of the ninth transistor, a second electrode of the tenth transistor, and a first electrode of the eleventh transistor are connected together.

According to an exemplary embodiment, there is provided an MIP circuit, wherein the input circuit comprises: a first transistor having a control electrode connected with the first control terminal, a first electrode connected with the first input terminal, and a second electrode connected with the first node; and a second transistor having a control electrode connected with the first control terminal, a first electrode connected with the second input terminal, and a second electrode connected with the second node; the control circuit comprises: a third transistor having a control electrode and a first electrode connected with the first voltage terminal, and a second electrode connected with the third node; and the fourth transistor having a control electrode and a first electrode connected with the first voltage terminal, and a second electrode connected with the fourth node; a fifth transistor having a control electrode connected with the fourth node, a first electrode connected with the third node, and a second electrode connected with the second voltage terminal; a sixth transistor having a control electrode connected with the third node, a first electrode connected with the fourth node, and a second electrode connected with the second voltage terminal; a seventh transistor having a control electrode connected with the first node, a first electrode connected with the third node, and a second electrode connected with the second voltage terminal; an eighth transistor having a control electrode connected with the second node, a first electrode connected with the fourth node, and a second electrode connected with the second voltage terminal; the output circuit comprises: a ninth transistor having a control electrode connected with the third node, and a first electrode connected with the first input terminal; a tenth transistor having a control electrode connected with the fourth node, and a first electrode connected with the second input terminal; the eleventh transistor having a control electrode connected with the second control terminal, and a second electrode connected with the output terminal; wherein a second electrode of the ninth transistor, a second electrode of the tenth transistor, and a first electrode of the eleventh transistor are connected together.

According to an exemplary embodiment, each transistor is an N-type transistor; or each transistor is a P-type transistor.

According to another exemplary embodiment, there is provided an LCD panel comprising: a plurality of pixels arranged in an array; wherein iii each of the plurality of pixels comprises the MIP circuit as described above.

According to an exemplary embodiment, the plurality of pixels included in the LCD panel are n×m pixels, and arranged in an n×m array, and the LCD panel further comprises: n first gate lines, the n first gate lines each extending in a first direction, and each of the first gate lines being configured to transmit the first control signal; n second gate lines, the n second gate lines each extending in the first direction, and each of the second gate lines being configured to transmit the second control signal; m first data lines, the m first data lines each extending in a second direction, and each of the first data lines being configured to transmit the first input signal; m second data lines, the m second data lines each extending in the second direction, and each of the second data lines being configured to transmit the second input signal; a first voltage line configured to transmit the first voltage signal; a second voltage line configured to transmit the second voltage signal; the MIP circuit included in a pixel located in the i-th row and the j-th column in the array having the first voltage terminal connected with the first voltage line, the second voltage terminal connected with the second voltage line, the first control terminal connected with the i-th first gate line, and the second control terminal connected with the i-th second gate line, the first input terminal connected with the j-th first data line, and the second input terminal connected with the j-th second data line; wherein the first direction is perpendicular to the second direction, and n and m are both integers greater than or equal to 1, i is an integer and $1 \le i \le n$, and j is an integer and $1 \le j \le m$.

According to an exemplary embodiment, the LCD panel further comprises: a first gate driver configured to provide the first control signal for the n first gate lines; a second gate driver configured to provide the second control signal for the n second gate lines; a first data driver configured to provide the first input signal for the m first data lines; and a second data driver configured to provide the second input signal for the m second data lines.

According to a further exemplary embodiment, there is provided a driving method for an MIP circuit as described above, comprising: applying the first control signal to the first control terminal; while the first control signal is active, applying the first input signal to the first input terminal and applying the second input signal to the second input terminal to make the third node or the fourth node at an active potential; applying the second control signal to the second control terminal, and while the first control signal is inactive and the second control signal is active, bringing one of the first input terminal and the second input terminal into conduction with the output terminal according to the potential of the third node and the fourth node.

According to an exemplary embodiment, while the first control signal is active, one of the first input signal and the second input signal is at an active potential, and the other thereof is at an inactive potential.

BRIEF DESCRIPTION OF DRAWINGS

The drawings are used to provide a further understanding of the technical solutions of the present disclosure, which constitutes a part of the specification, and are used, together with the exemplary embodiments, to explain the technical solutions of the present disclosure, which, however, do not constitute any limitation to the technical solutions of the present disclosure.

It shall be noted that the drawings are not necessarily drawn in proportion. Moreover, identical or similar parts, components and/or elements are indicated by the same reference numerals throughout the drawings.

DETAILED DESCRIPTION

To better clarify the objective, technical solutions and advantages of the present disclosure, the exemplary embodiments will be explained in detail with reference to the drawings. It should be noted that, in the description of the specification of the present application, expressions referring to "an embodiment", "some embodiments", "exemplary embodiments", "specific examples" or "some examples" are intended to mean that specific features, structures, materials or characteristics described with reference to the embodiments or examples are contained in at least one embodiment or example of this disclosure. Therefore, schematic descriptions with respect to the above expressions herein do not have to be directed at the same embodiments or examples herein. Instead, specific features, structures, materials or characteristics described thereby can be combined in a suitable manner in any one or more embodiments or examples. Besides, where no contradiction is caused, those skilled in the art can combine and assemble different embodiments or examples described in the specification and features of different embodiments or examples.

The steps involved in the methods described in the present disclosure are exemplary, and are not necessarily to be implemented in the order as listed. Instead, one or more of these steps may be implemented in a different order or simultaneously according to actual situations. Furthermore, the described method may also comprise other additional steps according to actual situations. Additionally, the steps illustrated in the flowchart of the drawings can be executed in a computer system in the form of e.g. a set of computer executable instructions.

Unless otherwise defined, all terms (including technical terms and scientific terms) used herein have the same meaning as commonly understood by one having ordinary skills in the art. It should also be understood that terms such as those defined in a common dictionary should be construed as having the same meaning as in the related art and/or in the context of this specification, and will not be construed in an ideal or overly formal sense, unless defined explicitly as such herein.

The terms used herein are used only for describing exemplary embodiments rather than limiting this disclosure. As used herein, the singular forms of "one", "a" and "the" are intended to include the plural forms too, unless explicitly indicated otherwise in the context. It should also be understood that when used in this specification, the terms of "comprise" and/or "include" refer to the presence of features, entireties, steps, operations, elements and/or components that are mentioned, but do not exclude the presence or the addition of one or more other features, entireties, steps, operations, elements, components and/or groups thereof. Moreover, the term of "and/or" herein comprises any and all combination of one or more of the listed items that are associated. The terms "connected" or "coupled" and those similar thereto are not limited to physical or mechanical connection, but may comprise electrical connection, either directly or indirectly. It should be understood that when an element is described as being "connected to another element" or "coupled to another element", it can be connected or coupled to another element directly, or there can be an intermediate element. In contrast, when an element is described as being "directly connected to another element" or "directly coupled to another element", there is no intermediate element. The terms such as "upper", "lower", "left" and "right" are only used to indicate relative positional relations. When the absolute position of the described object is changed, the relative positional relation may also be changed accordingly.

Some techniques, structures and materials commonly known in the art of this disclosure are not described in detail for the sake of clarity so as to avoid making the present application tediously long.

Figure 1:
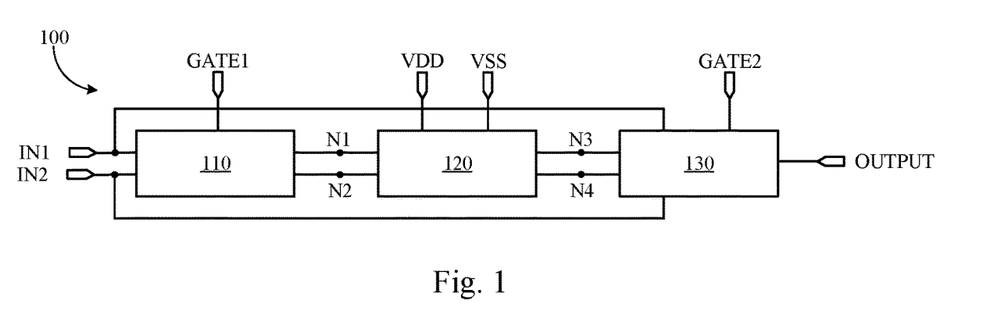
FIG. 1 is a schematic structural block diagram of an MIP circuit according to an exemplary embodiment.

Referring to FIG. 1, it is a schematic structural block diagram of an MIP circuit according to an exemplary embodiment. As shown in FIG. 1, the MIP circuit 100 may comprise a first voltage terminal VDD configured to receive a first voltage signal; a second voltage terminal VSS configured to receive a second voltage signal; a first input terminal IN1 configured to receive a first input signal; a second input terminal IN2 configured to receive a second input signal; a first control terminal GATE1 configured to receive a first control signal; a second control terminal GATE2 configured to receive a second control signal; and an output terminal OUTPUT configured to output an output signal. It shall be understood that the first input signal received at the first input terminal IN1 and the second input signal received at the second input terminal IN2 may be any suitable signal. As a non-limiting example, the first input signal and the second input signal may be data signals generated by corresponding date drivers. The present disclosure imposes no limitation to the first input signal and the second input signal. Moreover, the MIP circuit 100 may also comprise an input circuit 110, a control circuit 120 and an output circuit 130.

The input circuit 110 may be configured to: in response to the first control signal received at the first control terminal GATE1 being active, bring the first input terminal IN1 into conduction with a first node N1, and bring the second input terminal IN2 into conduction with a second node N2. The control circuit 120 may be configured to: set the potential of a third node N3 based on the potential of the first node N1, and set the potential of a fourth node N4 based on the potential of the second node N2, so as to make the third node N3 or the fourth node N4 at an active potential, and then maintain the potentials of the third node N3 and the fourth node N4. The output circuit 130 may be configured to: in response to the second control signal received at the second control terminal GATE2 being active and the third node N3 being at an active potential, bring the first input terminal IN1 into conduction with the output terminal OUTPUT, and in response to the second control signal received at the second control terminal GATE2 being active and the fourth node N4 being at an active potential, bring the second input terminal IN2 into conduction with the output terminal OUTPUT.

It shall be noted that the term "active potential" used herein refers to a potential at which a circuit element (e.g., a transistor) involved is enabled, and the term "inactive potential" used herein refers to a potential at which the circuit element involved is disabled. As for an N-type transistor, an active potential is a high potential and an inactive potential is a low potential. As for a P-type transistor, an active potential is a low potential and an inactive potential is a high potential. It shall be understood that an active potential or an inactive potential does not intend to refer to a specific potential, but may comprise a range of potentials. In addition, the terms "level", "voltage level" and "potential" herein may be used interchangeably.

As a non-limiting example, the first voltage terminal VDD may be a high level voltage terminal or a lower level voltage terminal, the second voltage terminal VSS may be a high level voltage terminal or a low level voltage terminal, and when the first voltage terminal VDD is a high level voltage terminal, the second voltage terminal VSS is a low level voltage terminal, and when the first voltage terminal VDD is a low level voltage terminal, the second voltage terminal VSS is a high level voltage terminal. Herein, the high level voltage terminal refers to a voltage terminal that continuously provides a high level voltage signal, and the low level voltage terminal refers to a voltage terminal that continuously provides a low level voltage signal.

Figure 2:
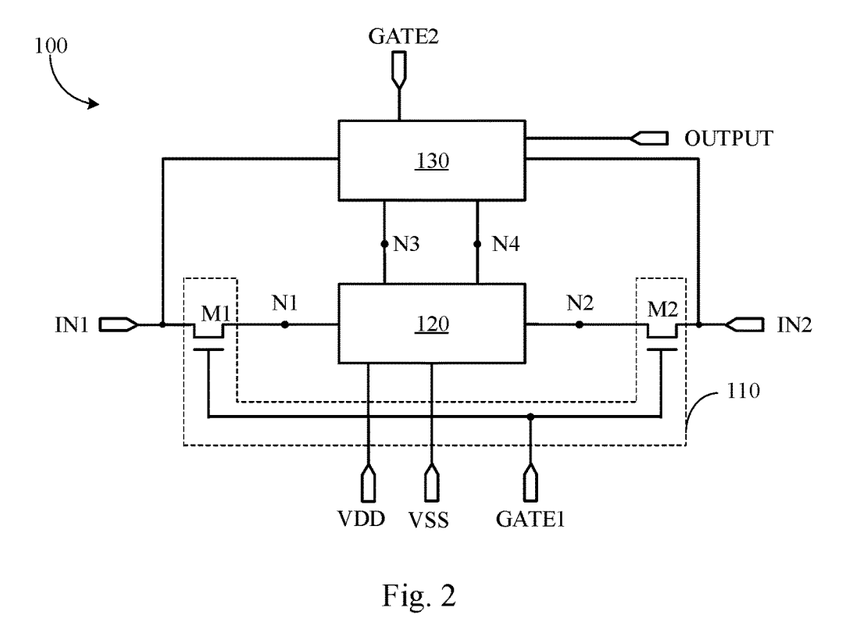
FIG. 2 schematically shows a circuitry structure of an input circuit of the MIP circuit as shown in FIG. 1.

Referring to FIG. 2, it schematically shows a circuitry structure of an input circuit 110 of the MIP circuit 100 as shown in FIG. 1. As shown in FIG. 2, the input circuit 110 of the MIP circuit 100 may comprise a first transistor M1 and a second transistor M2.

It shall be noted that the transistor used in any exemplary embodiment may be a thin-film transistor, a field effect transistor or other means with the same characteristics. In exemplary embodiments, each transistor is typically made in such a way that the source and drain thereof may be used interchangeably, so there is no essential difference between the source and drain in the depiction of the connection relationship. In the exemplary embodiments, in order to distinguish the source and drain of a transistor, one of them is called a first electrode, the other is called a second electrode, and a gate is called a control electrode. In the case of an N-type transistor, a gate turn-on voltage has a high potential, and a gate turn-off voltage has a low potential; and in the case of a P-type transistor, a gate turn-on voltage has a low potential, and a gate turn-off voltage has a high potential.

The following exemplary embodiment, as a non-limiting example, will be described on the basis of an N-type transistor. However, it can be easily understood that under the teaching of the present disclosure, those skilled in the art may substitute a P-type transistor for one N-type transistor, or more, or all N-type transistors in the exemplary embodiments, or may add or remove one or more elements from the exemplary embodiments, without departing from the spirit and scope of the present disclosure. Moreover, other embodiments may also be envisaged in the case of not conflicting with the teachings of the present disclosure.

With further reference to FIG. 2, as for the input circuit 110 in the MIP circuit 100, to be specific, a first transistor M1 has a control electrode connected with the first control terminal GATE1, a first electrode connected with the first input terminal IN1, and a second electrode connected with the first node N1; and a second transistor M2 has a control electrode connected with the first control terminal GATE1, a first electrode connected with the second input terminal IN2, and a second electrode connected with the second node N2.

The exemplary embodiment as shown in FIG. 2 only illustrates an exemplary circuitry structure of the input circuit 110. Those skilled in the art may, however, easily understand that the implementations of the input circuit 110 are not limited thereto, but may be realized in any suitable manner as long as the function thereof can be achieved.

According to the exemplary embodiment, the control circuit 120 in the MIP circuit 100 may comprise: a first control sub-circuit and a second control sub-circuit. The first control sub-circuit may be configured to: in response to the first node N1 being at an active potential, make the third node N3 at an inactive potential, and in response to the first node N1 being at an inactive potential, make the third node N3 at an active potential, and maintain the potential of the third node N3. The second control sub-circuit may be configured to: in response to the second node N2 being at an active potential, make the fourth node N4 at an inactive potential, and in response to the second node N2 being at an inactive potential, make the fourth node N4 at an active potential, and maintain the potential of the fourth node N4.

Figure 3:
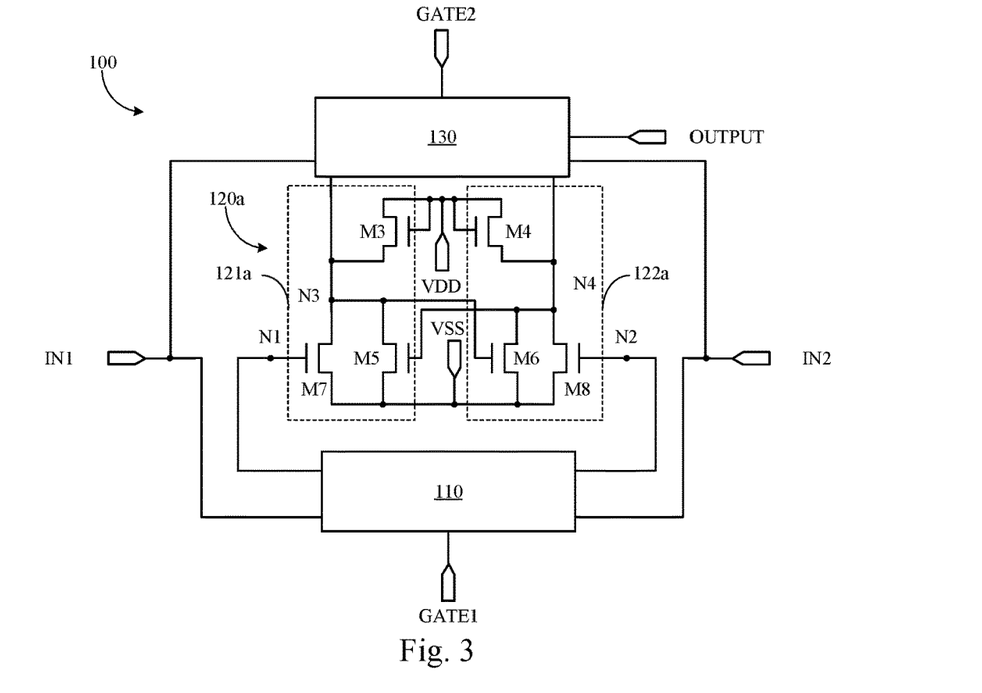
FIG. 3 schematically shows a first circuitry structure of a control circuit of the MIP circuit as shown in FIG. 1.

Referring to FIG. 3, it schematically shows a first exemplary circuitry structure of a control circuit of the MIP circuit 100 as shown in FIG. 1. As shown in FIG. 3, the control circuit 120a may comprise a first control sub-circuit 121a and a second control sub-circuit 122a.

The first control sub-circuit 121a may comprise a third transistor M3, a fifth transistor M5 and a seventh transistor M7. The third transistor M3 has a control electrode and a first electrode connected with the first voltage terminal VDD, and a second electrode connected with the third node N3; the fifth transistor M5 has a control electrode connected with the fourth node N4, a first electrode connected with the third node N3, a second electrode connected with the second voltage terminal VSS; and a seventh transistor M7 has a control electrode connected with the first node N1, a first electrode connected with the third node N3, and a second electrode connected with the second voltage terminal VSS. It shall be noted that the third transistor M3 and the seventh transistor M7 are dimensioned to have such a width-to-length ratio (which determines the equivalent on-resistance of a transistor), that is, the third node N3 is set to be at an inactive potential when both the third transistor M3 and the seventh transistor M7 are turned on; similarly, the third transistor M3 and the fifth transistor M5 are dimensioned to have such a width-to-length ratio, that is, the third node N3 is set to be at an inactive potential when both the third transistor M3 and the fifth transistor M5 are turned on.

As for the first control sub-circuit 121a, the third transistor M3 is always turned on. When the first node N1 is at an active potential, the seventh transistor M7 is turned on, and at this time, the dimensions (and the corresponding equivalent on-resistances) of the third transistor M3 and the seventh transistor M7 are arranged to make the third node N3 at an inactive potential; and when the first node N1 is at an inactive potential, the seventh transistor M7 is turned off, so that the third node N3 is brought into conduction with the first voltage terminal VDD through the third transistor M3 and is therefore at an active potential. Moreover, in the first control sub-circuit 121a, the fifth transistor M5 may be used to maintain the potential of the third node N3. For instance, when the third node N3 is at an inactive potential, the fourth node N4 is at an active potential and the fifth transistor M5 is turned on so that the third node N3 is brought into conduction with the second voltage terminal VSS to maintain the third node N3 at an inactive potential; and when the third node N3 is at an active potential, the fourth node N4 is at an inactive potential and the fifth transistor M5 is turned off, thereby not affecting the potential of the third node N3.

The second control sub-circuit 122a may comprise a fourth transistor M4, a sixth transistor M6 and an eighth transistor M8. The fourth transistor M4 has a control electrode and a first electrode connected with the first voltage terminal VDD, and a second electrode connected with the fourth node N4. The sixth transistor M6 has a control electrode connected with the third node N3, a first electrode connected with the fourth node N4, a second electrode connected with the second voltage terminal VSS. The eighth transistor M8 has a control electrode connected with the second node N2, a first electrode connected with the fourth node N4, and a second electrode connected with the second voltage terminal VSS. It shall be noted that the fourth transistor M4 and the eighth transistor M8 are dimensioned to have such a width-to-length ratio (which determines the equivalent on-resistance of a transistor), that is, the fourth node N4 is set to be at an inactive potential when both the fourth transistor M4 and the eighth transistor M8 are turned on; similarly, the fourth transistor M4 and the sixth transistor M6 are dimensioned to have such a width-to-length ratio, that is, the fourth node N4 is set to be at an inactive potential when both the fourth transistor M4 and the sixth transistor M6 are turned on.

As for the second control sub-circuit 122a, the fourth transistor M4 is always turned on. When the second node N2 is at an active potential, the eighth transistor M8 is turned on, and at this time, the dimensions (and the corresponding equivalent on-resistances) of the fourth transistor M4 and the eighth transistor M8 are arranged to make the fourth node N4 at an inactive potential; and when the second node N2 is at an inactive potential, the eighth transistor M8 is turned off, so that the fourth node N4 is brought into conduction with the first voltage terminal VDD through the fourth transistor M4 and is therefore at an active potential. Moreover, in the second control sub-circuit 122a, the sixth transistor M6 may be used to maintain the potential of the fourth node N4. For instance, when the fourth node N4 is at an inactive potential, the third node N3 is at an active potential and the sixth transistor M6 is turned on so that the fourth node N4 is brought into conduction with the second voltage terminal VSS to maintain the fourth node N4 at an inactive potential; and when the fourth node N4 is at an active potential, the third node N3 is at an inactive potential and the sixth transistor M6 is turned off, thereby not affecting the potential of the fourth node N4.

Figure 4:
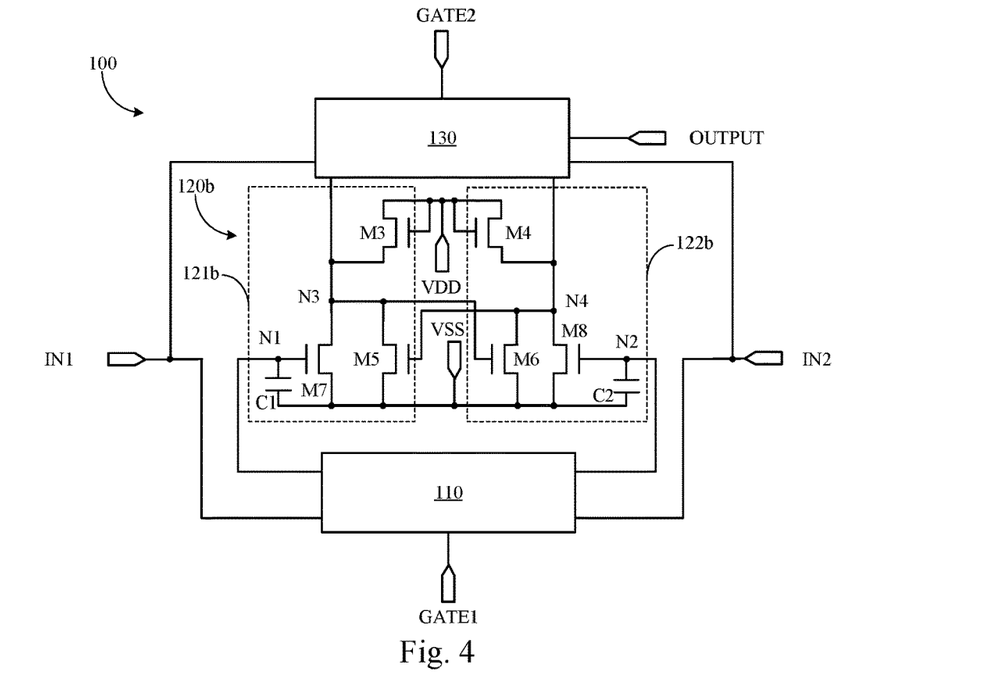
FIG. 4 schematically shows a second circuitry structure of a control circuit of the MIP circuit as shown in FIG. 1.

Turning to FIG. 4, it schematically shows a second exemplary circuitry structure of a control circuit of the MIP circuit 100 as shown in FIG. 1. As shown in FIG. 4, the control circuit 120b may comprise a first control sub-circuit 121b and a second control sub-circuit 122b.

Different from the first control sub-circuit 121a as shown in FIG. 3, the first control sub-circuit 121b as shown in FIG. 4 also comprises a first capacitor C1, wherein the first capacitor C1 has a first electrode connected with the first node N1 and a second electrode connected with the second voltage terminal VSS. Similarly, different from the second control sub-circuit 122a as shown in FIG. 3, the second control sub-circuit 122b as shown in FIG. 4 also comprises a second capacitor C2, wherein the second capacitor C2 has a first electrode connected with the second node N2 and a second electrode connected with the second voltage terminal VSS. The first capacitor C1 and the second capacitor C2 may filter out noises applied into the signals at the first node N1 and the second node N2, and may also maintain the potentials at the first node N1 and the second node N2, thereby further facilitating the maintenance of the potentials at the third node N3 and the fourth node N4. To be specific, for instance, when the first node N1 or the second node N2 is at an active potential, the first capacitor C1 or the second capacitor C2 is correspondingly charged. Then, when the first control signal at the first control terminal GATE1 is inactive, the first node N1 or the second node N2 may still be maintained at an active potential due to the first capacitor C1 and the second capacitor C2, thereby facilitating the maintenance of the potentials at the third node N3 or the fourth node N4. That is to say, in the first control sub-circuit 121b and the second control sub-circuit 122b as shown in FIG. 4, in addition to the fifth transistor M5 and the sixth transistor M6, the first capacitor C1 and the second capacitor C2 are utilized to maintain the potentials of the third node N3 and the fourth node N4.

Figure 5:
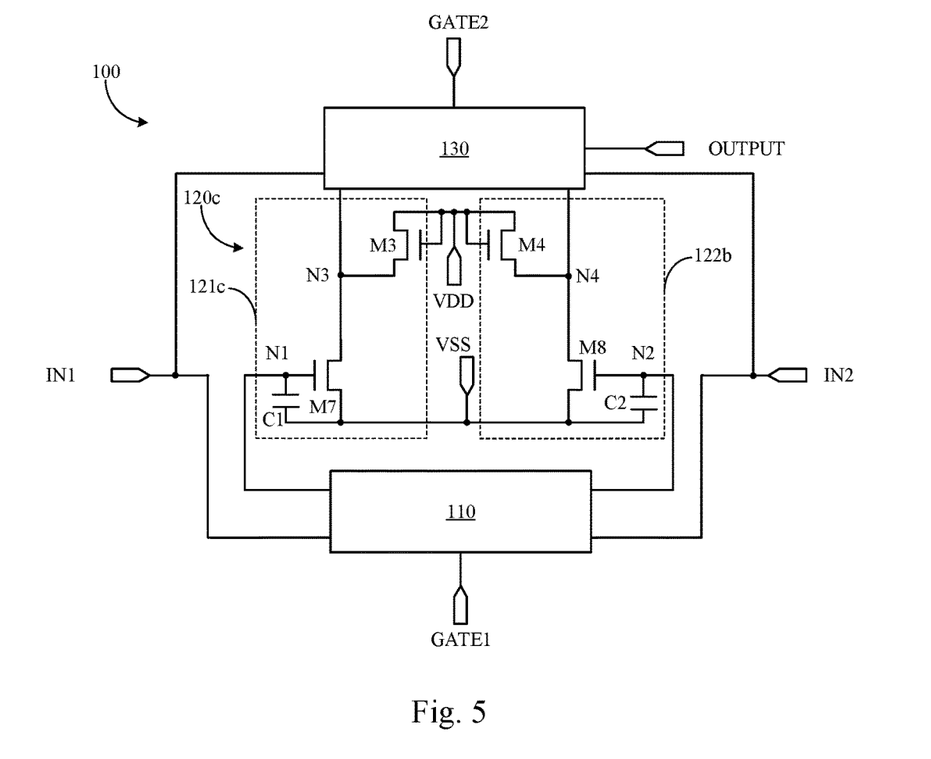
FIG. 5 schematically shows a third circuitry structure of a control circuit of the MIP circuit as shown in FIG. 1.

Referring to FIG. 5, it schematically shows a third exemplary circuitry structure of a control circuit of the MIP circuit 100 as shown in FIG. 1. As shown in FIG. 5, the control circuit 120c may comprise a first control sub-circuit 121c and a second control sub-circuit 122c.

Different from the first control sub-circuit 121b and the second control sub-circuit 122b as shown in FIG. 4, the first control sub-circuit 121c as shown in FIG. 5 does not comprise the fifth transistor M5, and the second control sub-circuit 122c as shown in FIG. 5 does not comprise the sixth transistor M6. Thus, when the first node N1 or the second node N2 is at an active potential, the first capacitor C1 or the second capacitor C2 is correspondingly charged. Then, when the first control signal at the first control terminal GATE1 is inactive, the first node N1 or the second node N2 may still be maintained at an active potential due to the first capacitor C1 and the second capacitor C2, thereby maintaining the potential of the third node N3 or the fourth node N4. That is to say, in the first control sub-circuit 121c and the second control sub-circuit 122c as shown in FIG. 5, only the first capacitor C1 and the second capacitor C2 are utilized to maintain the potentials of the first node N1 and the second node N2, thereby maintaining the potentials of the third node N3 and the fourth node N4.

It shall be understood that in the exemplary embodiments, FIGS. 3 to 5 only illustrate some exemplary circuitry structures of the control circuit 120 of the MIP circuit 100. Those skilled in the art may easily understand that the implementations of the control circuit 120 are not limited thereto, and any suitable circuitry structure may be applied to the control circuit 120 of the MIP circuit 100 as long as the function of the control circuit 120 described in the present disclosure can be realized.

Figure 6:
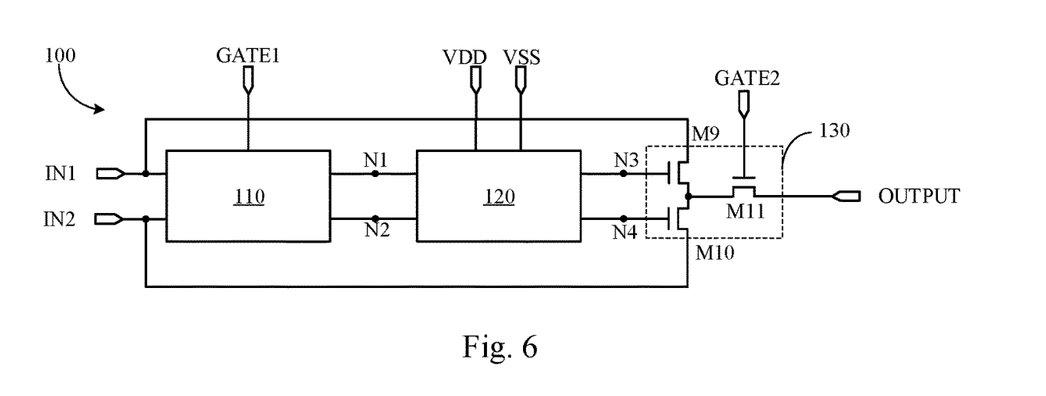
FIG. 6 schematically shows a circuitry structure of an output circuit of the MIP circuit as shown in FIG. 1.

Referring to FIG. 6, it schematically shows an exemplary circuitry structure of an output circuit 130 of the MIP circuit 100 as shown in FIG. 1. As shown in FIG. 6, the output circuit 130 of the MIP circuit 100 according to an exemplary embodiment may comprise a ninth transistor M9, a tenth transistor M10 and an eleventh transistor M11.

To be specific, the ninth transistor M9 has a control electrode connected with the third node N3, a first electrode connected with the first input terminal IN1, and a second electrode connected with the second electrode of the tenth transistor M10 and the first electrode of the eleventh transistor M11. The tenth transistor M10 has a control electrode connected with the fourth node N4, a first electrode connected with the second input terminal IN2, and a second electrode connected with the second electrode of the ninth transistor M9 and the first electrode of the eleventh transistor M11. The eleventh transistor M11 has a control electrode connected with the second control terminal GATE2, and a second electrode connected with the output terminal OUTPUT.

It shall be understood that the exemplary embodiment as shown in FIG. 6 only illustrates an exemplary circuitry structure of the output circuit 130. However, those skilled in the art may easily understand that the implementations of the output circuit 130 are not limited thereto, and any suitable circuitry structure may be applied as long as the function thereof can be realized.

Figure 7:
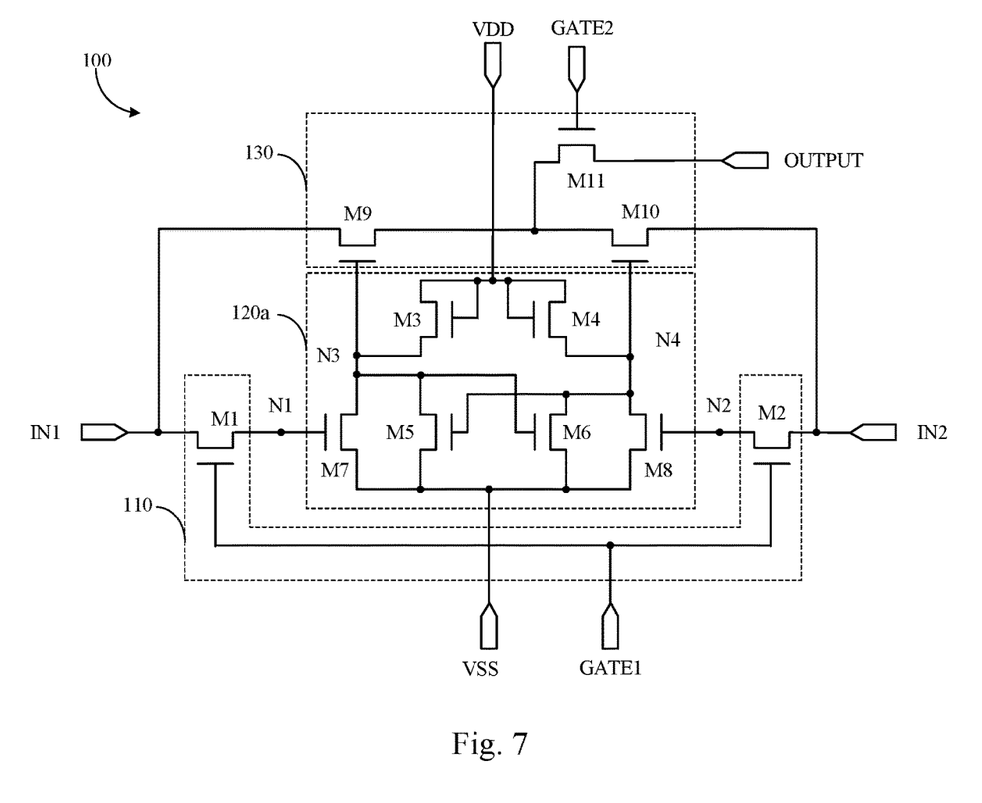
FIG. 7 schematically shows a circuitry structure of the MIP circuit as shown in FIG. 1.

Referring to FIG. 7, it schematically shows an exemplary circuitry structure of the MIP circuit 100 according to an exemplary embodiment. As shown in FIG. 7, the MIP circuit 100 comprises an input circuit 110, a control circuit 120a and an output circuit 130, wherein the input circuit 110 adopts the circuitry structure as shown in FIG. 2, the control circuit 120a adopts the circuitry structure as shown in FIG. 3, and the output circuit 130 adopts the circuitry structure as shown in FIG. 6. These circuitry structures have been described in detail previously with reference to FIGS. 2, 3 and 6 and will not be reiterated.

It shall also be pointed out that the exemplary embodiment as shown in FIG. 7 specifically illustrates the exemplary circuitry structures of the input circuit 110, the control circuit 120a and the output circuit 130 of the MIP circuit 100. However, those skilled in the art may easily understand that the implementations of the circuits in the MIP circuit 100 are not limited thereto, and any suitable circuitry structure may be adopted as long as their respective functions can be realized.

As mentioned above in the present disclosure, the transistors M1 to M11 may be N-type transistors or P-type transistors, so as to unify processing flowcharts and reduce processing procedures and difficulties, thereby facilitating the improvement of product yield and reduction of production costs. Moreover, in the exemplary embodiments, all transistors may be a-Si thin film transistors, and the thin-film transistors may be specifically selected as bottom-gate structure thin film transistors or top-gate structure thin film transistors. The present disclosure imposes no limitations to those aspects of the transistors as long as the on/off functions can be realized.

Figure 8:
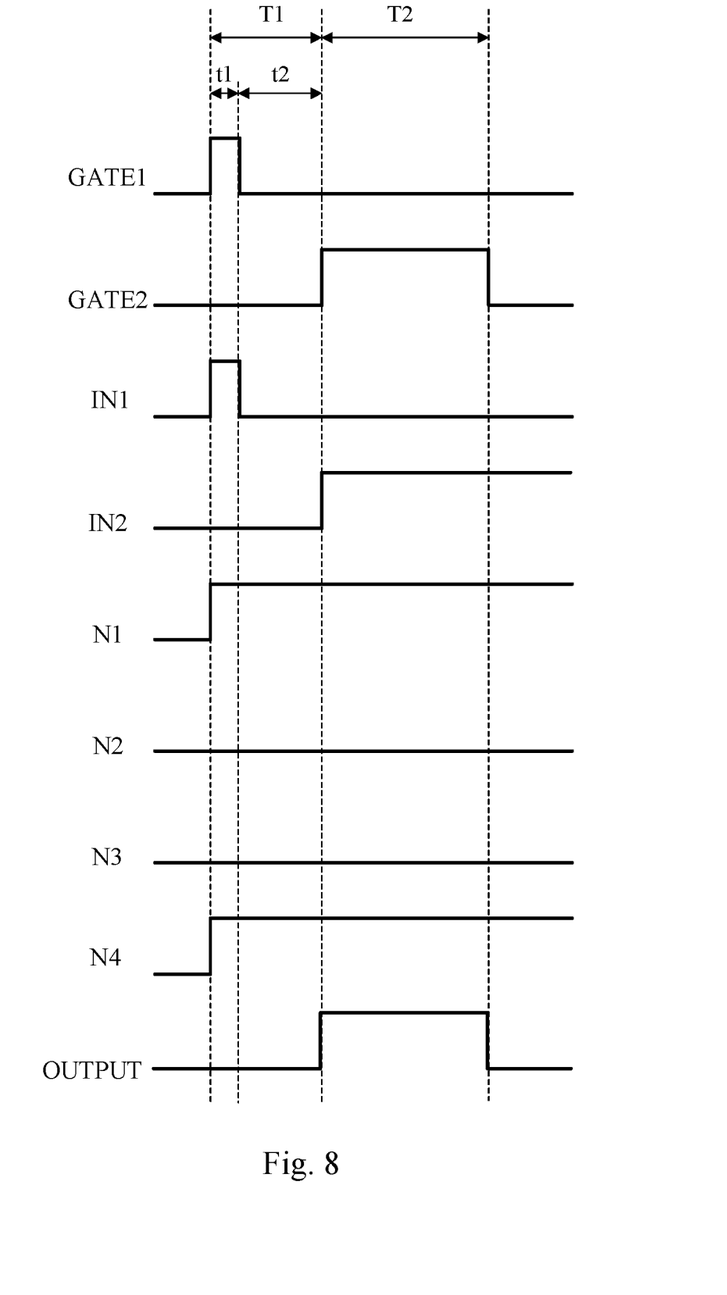
FIG. 8 is a schematic time-sequence diagram applicable to the MIP circuit according to an exemplary embodiment.

Referring to FIG. 8, it is an exemplary time-sequence diagram applicable to the MIP circuit 100 as shown in FIGS. 1 to 7. In the following text, the transistors M1 to M11 of the MIP circuit 100 according to an exemplary embodiment may be N-type thin film transistors, the first voltage terminal VDD is a high level voltage terminal, and the second voltage terminal VSS is a low level voltage terminal. In this case, an active potential is a high potential, and an inactive potential is a low potential. Moreover, in the following depiction, a high potential is represented by 1 and a low potential is represented by 0. For instance, the first control signal received at the first control terminal GATE1 being active is represented as GATE1=1, and correspondingly, the first control signal being inactive is represented as GATE1=0.

As shown in FIG. 8, the time sequence of the MIP circuit 100 according to an exemplary embodiment comprises two phases: a write-in maintenance phase T1 and a display phase T2, and the write-in maintenance phase T1 may comprise a write-in phase t1 and a maintenance phase t2.

During the write-in phase t1 of the time sequence as shown in FIG. 8, GATE1=1, GATE2=0, IN1=1, IN2=0, VDD=1, and VSS=0. Since GATE1=1, the first transistor M1 and the second transistor M2 are turned on. Since IN1=1, the first node N1 is at a high potential, i.e., N1=1 so that the seventh transistor M7 is turned on. At this time, the third transistor M3 is also turned on under the action of the high potential of the first voltage terminal VDD. As mentioned above, the third transistor M3 and the seventh transistor M7 are dimensioned such that the third node N3 is set at an inactive potential when both the third transistor M3 and the seventh transistor M7 are turned on. Thus, the third node N3 is at an inactive potential, i.e., N3=0. Since IN2=0, the second node N2 is at a low potential, i.e., N2=0, so that the eighth transistor M8 is turned off. At this time, the fourth transistor M4 is turned on under the action of the high potential of the first voltage terminal VDD, thereby pulling up the potential of the fourth node N4, i.e., N4=1. Since the eighth transistor M8 is turned off, the potential of the fourth node N4 will not be pulled down. Thus, the potentials of the third node N3 and the fourth node N4 are set to be N3=0 and N4=1.

In the write-in phase t1, although N3=0 and N4=1 such that the ninth transistor M9 is turned off and the tenth transistor M10 is turned on, since the second control signal of the second control terminal GATE2 is at a low level, i.e., GATE2=0, the eleventh transistor M11 is turned off such that the output terminal OUTPUT has no output.

During the maintenance phase t2 of the time sequence as shown in FIG. 8, GATE1=0, GATE2=0, IN1=0, IN2=0, VDD=1, and VSS=0. Since GATE1=0, the first transistor M1 and the second transistor M2 are turned off such that the first input signal at the first input terminal IN1 and the second input signal at the second input terminal IN2 will not act on the first node N1 and the second node N2 any longer. In the time sequence shown in FIG. 8, IN1=0, and IN2=0 at this time. But it is easily understood that in the maintenance phase t2, the first input signal and the second input signal may be at any suitable state. The potential of the first node N1 will continue to be maintained at a high level, and the potential of the second node N2 will continue to be maintained at a low level, i.e., N1=1, and N2=0. The reason is that as for the control circuit 120a as shown in FIG. 3, when the first transistor M1 and the second transistor M2 are turned off, the first node N1 and the second node N2 are at a suspension state and the potentials thereof are neither pulled up nor pulled down, so the first node N1 and the second node N2 will continue to maintain their existent potentials; and as for the control circuit 120b as shown in FIG. 4 and the control circuit 120c as shown in FIG. 5, the first capacitor C1 and the second capacitor C2 may maintain the first node N1 and the second node N2 continuously at their existent potentials. In the maintenance phase t2, the third node N3 is still maintained at a low potential, and the fourth node N4 is still maintained at a high potential, i.e., N3=0, and N4=1. The reason is that, as for the control circuit 120a as shown in FIG. 3, since N4=1, the fifth transistor M5 is turned on so as to maintain the third node N3 at a low potential, and since N3=0, the sixth transistor M6 is turned off so as to continuously maintain the fourth node N4 at a high potential, thereby maintaining N3=0 and N4=1; as for the control circuit 120c as shown in FIG. 5, the first capacitor C1 and the second capacitor C2 maintain N1=1 and N2=0, thereby maintaining N3=0 and N4=1; and as for the control circuit 120b as shown in FIG. 4, the above two cases for the maintenance function of the control circuits 120a and 120c exist, thereby maintaining N3=0 and N4=1 likewise.

Similarly, in the maintenance phase t2, although N3=0 and N4=1 such that the ninth transistor M9 is turned off and the tenth transistor M10 is turned on, since the second control signal of the second control terminal GATE2 is at a low level, i.e., GATE2=0, the eleventh transistor M11 is still turned off such that the output terminal OUTPUT still has no output.

During the display phase T2 of the time sequence as shown in FIG. 8, GATE1=0, GATE2=1, VDD=1, VSS=0, IN1=0, and IN2=1. Since GATE1=0, the first transistor M1 and the second transistor M2 are turned off. Since N3=0 and N4=1, the ninth transistor M9 is turned off and the tenth transistor M10 is turned on. Since GATE2=1, the eleventh transistor M11 is turned on. As stated above, since the tenth transistor M10 is turned on, during the display phase T2 of the time sequence as shown in FIG. 8, the output terminal OUTPUT is then brought into conduction with the second input terminal IN2, thereby outputting a high level signal.

It shall be explained that FIG. 8 makes an explanation by an example that the second input signal of the second input terminal IN2 is at a high level during the display phase T2, so the output signal of the output terminal OUTPUT is also at a high level. But it can be easily understood that if the second input signal of the second input terminal IN2 is at a low level during the display phase, the output signal of the output terminal OUTPUT is at a low level. During the display phase T2, the second input signal of the second input terminal IN2 is determined on the basis of the content to be displayed.

As a non-limiting example, in the write-in phase t1, the first input signal of the first input terminal IN1 may be at a low level, and the second input signal of the second input terminal IN2 may be at a high level. In such a case, the MIP circuit 100 sets and maintains the potential of the third node N3 at a high potential and the potential of the forth node N4 at a low potential in the write-in maintenance phase T1; and in the subsequent display phase T2, the output terminal OUTPUT is brought into conduction with the first input terminal IN1, thereby outputting the first input signal of the first input terminal IN1 as an output signal. In the exemplary embodiment, the working principle of the circuit is similar to the working principle of the MIP circuit 100 as stated above, which will not be reiterated.

It shall be noted that in the write-in phase, the levels of the first input signal of the first input terminal IN1 and the second input signal of the second input terminal IN2 are set in such a way that the third node N3 or the fourth node N4 is at an active level. The present disclosure makes no specific limitations to the specific levels of the input signals of the first input terminal IN1 and the second input terminal IN2 while the first control signal is active. Thus, in the display phase, when the second control signal provided by the second control terminal GATE2 is active, the output terminal OUTPUT is brought into conduction with one of the first input terminal IN1 and the second input terminal IN2, depending on the potentials of the third node N3 and the fourth node N4, so that the level of the output signal of the output terminal OUTPUT depends on the level of the input signal of the first input terminal IN1 or the second input terminal IN2 in the display phase. As a non-limiting example, the output terminal OUTPUT may be connected with a pixel electrode so that the output signal of the output terminal OUTPUT may provide the pixel electrode with a high-level or low-level signal for display. In addition, as a non-limiting example, the first input signal received at the first input terminal IN1 and the second input signal received at the second input terminal IN2 may be data signals generated by corresponding data drivers.

The MIP circuit 100 according to an exemplary embodiment sets and maintains the potentials of the third node N3 and the fourth node N4 in the write-in maintenance phase T1, and then provides an output signal for the output terminal OUTPUT under the control of the third node N3, the fourth node N4 and the second control terminal GATE2 in the display phase T2 so as to reduce the energy consumption of the display product by means of a low refresh rate, thereby satisfying the low-power consumption demands of, e.g., electronic paper, full-reflective or transflective display products.

It shall be noted that the MIP circuit 100 may be disposed in any suitable display product, for example, the suitable display product may be an LCD panel which may comprise: a plurality of pixels each comprising an MIP circuit, wherein the MIP circuits correspond to pixel electrodes in a one-to-one relationship, i.e., each MIP circuit is electrically connected with a corresponding pixel electrode. In the write-in maintenance phase, all MIP circuits of the LCD panel are written in with corresponding voltages and maintain the voltages. Later in the display phase, the LCD panel outputs corresponding signals to the pixel electrodes according to the voltages maintained by all the MIP circuits so as to display various images, thereby realizing image display with a low refresh rate, and reducing the work consumption of the display product.

Figure 9:
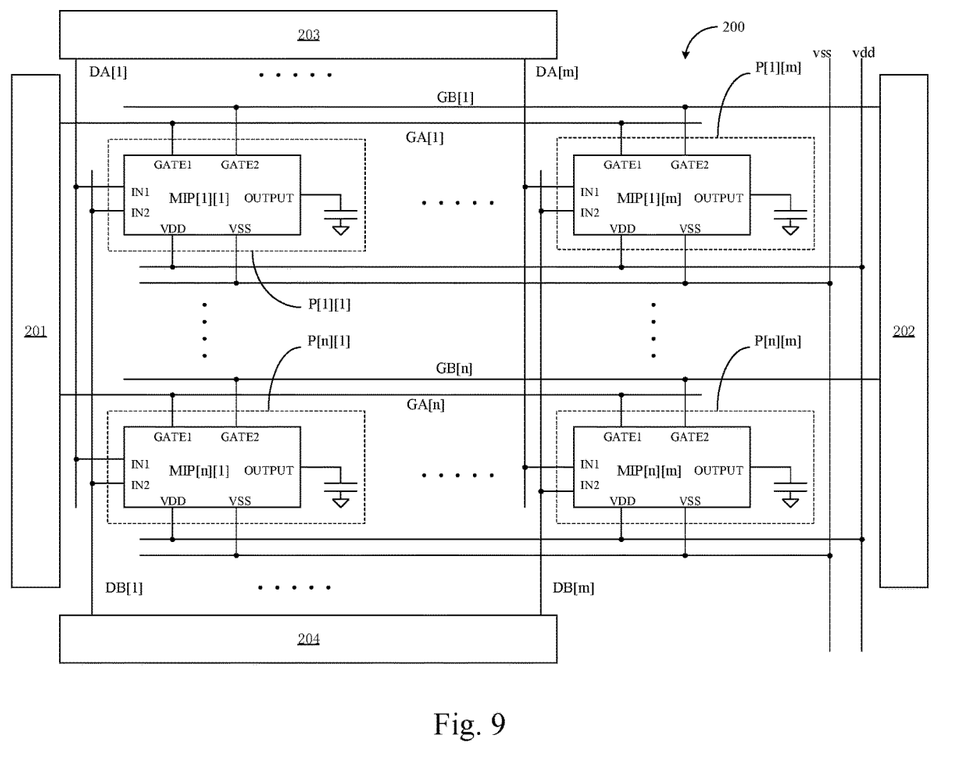
FIG. 9 is a schematic structural view of an LCD panel according to an exemplary embodiment of the present disclosure, wherein each pixel comprises the MIP circuit according to an exemplary embodiment.

Referring to FIG. 9, it schematically shows an LCD panel 200 according to an exemplary embodiment. The LCD panel 200 is used to display received image data and may have various structural types, such as add-on, in-cell, on-cell, OGS and so on. The LCD panel 200 may comprise a plurality of pixels arranged in the form of arrays. As shown in FIG. 9, the LCD panel 200 may comprise n×m pixels P[i][j] arranged in an n×m array, $1 \le i \le n$ and $1 \le j \le m$, wherein n and m are both integers greater than or equal to 1. Each pixel P[i][j] correspondingly comprise an MIP circuit MIP [i][j], $1 \le i \le n$ and $1 \le j \le m$, and these MIP circuits have the circuitry structure of the MIP circuit 100 described above with reference to FIGS. 1 to 8.

As shown in FIG. 9, the LCD panel 200 may further comprise n first gate lines GA[i] and n second gate lines GB[i], $1 \le i \le n$; m first data lines DA[j] and m second data lines DB[j], $1 \le j \le m$; and a first power line vdd and a second power line vss. The n first gate lines GA[i] and n second gate lines GB[i], $1 \le i \le n$, extend in a first direction, the m first data lines DA[j] and m second data lines DB[j], $1 \le j \le m$, extend in a second direction; and the first direction is perpendicular to the second direction. As for each MIP circuit MIP[i][j], the first input terminal IN1 is connected to the first data line DA[j], the second input terminal IN2 is connected to the second data line DB[j], the first control terminal GATE1 is connected to the first gate line GA[i], the second control terminal GATE2 is connected to the second gate line GB[i], wherein $1 \le i \le n$ and $1 \le j \le m$. In addition, the first voltage terminal VDD is connected to the first power line vdd, the second voltage terminal VSS is connected to the second power line vss, and the output terminal OUTPUT is connected to a corresponding pixel electrode.

As shown in FIG. 9, the LCD panel 200 may further comprise a first gate driver 201, a second gate driver 202, a first data driver 203 and a second data driver 204. The first gate driver 201 may be connected to the n first gate lines GA[i], $1 \le i \le n$, so as to apply a gate drive signal as a first control signal on each gate line; similarly, the second gate driver 202 may be connected to the n second gate lines GB[i], $1 \le i \le n$, so as to apply a gate drive signal as a second control signal on each gate line. The first data driver 203 may be connected to the m first data lines DA[j], $1 \le j \le m$, so as to apply a data signal as a first input signal on each data line; similarly, the second data driver 204 may be connected to the m second data lines DB[j], 1≤j≤m, so as to apply a data signal as a second input signal on each data line. Moreover, it can be readily realized that the LCD panel 200 also may not comprise the first gate driver 201, the second gate driver 202, the first data driver 203 or the second data driver 204. Instead, the first gate lines, the second gate lines, the first data lines and the second data lines are connected with one or more gate drivers and one or more data drivers separately through one or more corresponding interfaces.

As a non-limiting example, the LCD panel 200 may further comprise a voltage generator so as to provide a corresponding voltage signal, such as a first voltage signal and a second voltage signal, for the first power line vdd and the second power line vss. But it can be readily understood that the LCD panel 200 also may not comprise a voltage generator. Instead, the first power line vdd and the second power line vss are connected to an external power through a corresponding interface so as to receive corresponding voltage signals.

The MIP circuits in the LCD panel 200 provided by an exemplary embodiment may be made of the same type of transistors, so as to make the manufacturing process simple, thereby effectively reducing the production cost.

As a non-limiting example, the LCD panel 200 may be applied to a mobile phone, a tablet computer, a TV, a display, a laptop computer, a digital photo frame, a navigator, etc. The present disclosure imposes no limitation to the specific application of the LCD panel 200.

Figure 10:
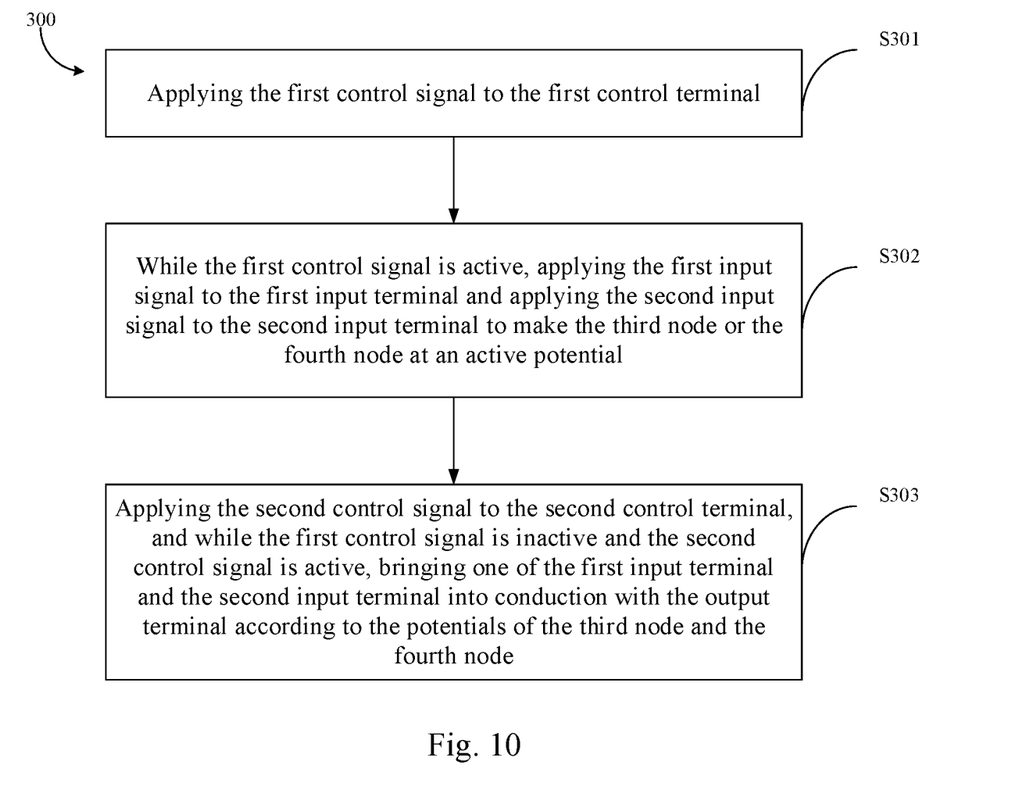
FIG. 10 is a flowchart of a driving method applicable to the MIP circuit according to an exemplary embodiment.

Referring to FIG. 10, it illustrates an exemplary driving method 300 for driving the MIP circuit 100 according to an exemplary embodiment.

The driving method 300 may comprise the steps of:

S301: applying the first control signal to the first control terminal GATE1;

S302: while the first control signal is active, applying the first input signal to the first input terminal IN1 and applying the second input signal to the second input terminal IN2 to make the third node N3 or the fourth node N4 at an active potential; and S303: applying the second control signal to the second control terminal GATE2, and while the first control signal is inactive and the second control signal is active, bringing one of the first input terminal IN1 and the second input terminal IN2 into conduction with the output terminal OUTPUT according to the potentials of the third node N3 and the fourth node N4.

Optionally, while the first control signal is active, one of the first input signal applied to the first input terminal IN1 and the second input signal applied to the second input terminal IN2 is at an active potential, and the other thereof is at an inactive potential. However, it can be understood that in the write-in phase of the MIP circuit 100 according to an exemplary embodiment, the levels of the first input signal of the first input terminal IN1 and the second input signal of the second input terminal IN2 are set in such a way that the third node N3 or the fourth node N4 is at an active level. The present disclosure makes no specific limitations to the specific levels of the first and second input signals of the first input terminal IN1 and the second input terminal IN2 while the first control signal is active.

The above contents are only exemplary embodiments, but the scope of the present disclosure is not limited thereto. As far as those ordinarily skilled in the art are concerned, various variations and modifications can be made without departing from the spirit and essence of the present disclosure. These variations and modifications are regarded as falling within the protection scope of the present disclosure. Thus, the scope of the present disclosure is determined based upon the scopes of the appended claims.

What is claimed is:

1. A memory-in-pixel circuit comprising:
   a first voltage terminal configured to receive a first voltage signal;
   a second voltage terminal configured to receive a second voltage signal;
   a first input terminal configured to receive a first input signal;
   a second input terminal configured to receive a second input signal;
   a first control terminal configured to receive a first control signal;
   a second control terminal configured to receive a second control signal;
   an output terminal configured to output an output signal;
   an input circuit configured to: in response to the first control signal being active, bring the first input terminal into conduction with a first node, and bring the second input terminal into conduction with a second node;
   a control circuit configured to: set the potential of a third node based on the potential of the first node, and set the potential of a fourth node based on the potential of the second node, so as to make the third node or the fourth node at an active potential, and maintain the potentials of the third node and the fourth node; and
   an output circuit configured to: in response to the second control signal being active and the third node being at an active potential, bring the first input terminal into conduction with the output terminal, and in response to the second control signal being active and the fourth node being at an active potential, bring the second input terminal into conduction with the output terminal,
   wherein the control circuit comprises:
     a first control sub-circuit configured to: in response to the first node being at an active potential, make the third node at an inactive potential, and in response to the first node being at an inactive potential, make the third node at an active potential, and maintain the potential of the third node, and
     a second control sub-circuit configured to: in response to the second node being at an active potential, make the fourth node at an inactive potential, and in response to the second node being at an inactive potential, make the fourth node at an active potential, and maintain the potential of the fourth node.

2. The memory-in-pixel circuit according to claim 1, wherein the input circuit comprises:
   a first transistor having a control electrode connected with the first control terminal, a first electrode connected with the first input terminal, and a second electrode connected with the first node; and
   a second transistor having a control electrode connected with the first control terminal, a first electrode connected with the second input terminal, and a second electrode connected with the second node.

3. The memory-in-pixel circuit according to wherein the first control sub-circuit comprises:
   a third transistor having a control electrode and a first electrode connected with the first voltage terminal, and a second electrode connected with the third node;
   a fifth transistor having a control electrode connected with the fourth node, a first electrode connected with the third node, and a second electrode connected with the second voltage terminal; and a seventh transistor having a control electrode connected with the first node, a first electrode connected with the third node, and a second electrode connected with the second voltage terminal.

4. The memory-in-pixel circuit according to claim 3, wherein the first control sub-circuit further comprises a first capacitor having a first electrode connected with the first node and a second electrode connected with the second voltage terminal.

5. The memory-in-pixel circuit according to claim 1, wherein the first control sub-circuit comprises:
   a third transistor having a control electrode and a first electrode connected with the first voltage terminal, and a second electrode connected with the third node;
   a seventh transistor having a control electrode connected with the first node, a first electrode connected with the third node, and a second electrode connected with the second voltage terminal; and
   a first capacitor having a first electrode connected with the first node, and a second electrode connected with the second voltage terminal.

6. The memory-in-pixel circuit according to claim 1, wherein, the second control sub-circuit comprises:
   a fourth transistor having a control electrode and a first electrode connected with the first voltage terminal, and a second electrode connected with the fourth node;
   a sixth transistor having a control electrode connected with the third node, a first electrode connected with the fourth node, and a second electrode connected with the second voltage terminal; and
   an eighth transistor having a control electrode connected with the second node, a first electrode connected with the fourth node, and a second electrode connected with the second voltage terminal.

7. The memory-in-pixel circuit according to claim 6, wherein the second control sub-circuit further comprises a second capacitor having a first electrode connected with the second node and a second electrode connected with the second voltage terminal.

8. The memory-in-pixel circuit according claim 1, wherein the second control sub-circuit comprises:
   a fourth transistor having a control electrode and a first electrode connected with the first voltage terminal, and a second electrode connected with the fourth node;
   an eighth transistor having a control electrode connected with the second node, a first electrode connected with the fourth node, and a second electrode connected with the second voltage terminal; and
   a second capacitor having a first electrode connected with the second node, and a second electrode connected with the second voltage terminal.

9. The memory-in-pixel circuit according to claim 1, wherein the output circuit comprises:
   a ninth transistor having a control electrode connected with the third node, and a first electrode connected with the first input terminal;
   a tenth transistor having a control electrode connected with the fourth node, and a first electrode connected with the second input terminal;
   an eleventh transistor having a control electrode connected with the second control terminal, and a second electrode connected with the output terminal;
   wherein a second electrode of the ninth transistor, a second electrode of the tenth transistor, and a first electrode of the eleventh transistor are connected together.

10. The memory-in-pixel circuit according to claim 1, wherein:
   the input circuit comprises:
      a first transistor having a control electrode connected with the first control terminal, a first electrode connected with the first input terminal, and a second electrode connected with the first node; and
      a second transistor having a control electrode connected with the first control terminal, a first electrode connected with the second input terminal, and a second electrode connected with the second node;
   the control circuit comprises:
      a third transistor having a control electrode and a first electrode connected with the first voltage terminal, and a second electrode connected with the third node; and
      a fourth transistor having a control electrode and a first electrode connected with the first voltage terminal, and a second electrode connected with the fourth node;
      a fifth transistor having a control electrode connected with the fourth node, a first electrode connected with the third node, and a second electrode connected with the second voltage terminal;
      a sixth transistor having a control electrode connected with the third node, a first electrode connected with the fourth node, and a second electrode connected with the second voltage terminal;
      a seventh transistor having a control electrode connected with the first node, a first electrode connected with the third node, and a second electrode connected with the second voltage terminal;
      an eighth transistor having a control electrode connected with the second node, a first electrode connected with the fourth node, and a second electrode connected with the second voltage terminal;
   the output circuit comprises:
      a ninth transistor having a control electrode connected with the third node, and a first electrode connected with the first input terminal;
      a tenth transistor having a control electrode connected with the fourth node, and a first electrode connected with the second input terminal;
      an eleventh transistor having a control electrode connected with the second control terminal, and a second electrode connected with the output terminal;
      wherein a second electrode of the ninth transistor, a second electrode of the tenth transistor, and a first electrode of the eleventh transistor are connected together.

11. The memory-in-pixel circuit according to claim 10, wherein
   each transistor is an N-type transistor; or
   each transistor is a P-type transistor.

12. A liquid crystal display panel comprising:
   a plurality of pixels arranged in an array;
   wherein each of the plurality of pixels comprises the memory-in-pixel circuit according to claim 1.

13. The liquid crystal display panel according to claim 12, wherein the plurality of pixels are n×m pixels, and arranged in an n×m array, and the liquid crystal display panel further comprises:
   n first gate lines, the n first gate lines each extending in a first direction, and each of the first gate lines being configured to transmit the first control signal;

n second gate lines, the n second gate lines each extending in the first direction, and each of the second gate lines being configured to transmit the second control signal;

m first data lines, the m first data lines each extending in a second direction, and each of the first data lines being configured to transmit the first input signal;

m second data lines, the m second data lines each extending in the second direction, and each of the second data lines being configured to transmit the second input signal;

a first voltage line configured to transmit the first voltage signal;

a second voltage line configured to transmit the second voltage signal;

the memory-in-pixel circuit comprised in a pixel located in the i-th row and the j-th column in the array having the first voltage terminal connected with the first voltage line, the second voltage terminal connected with the second voltage line, the first control terminal connected with the i-th first gate line, and the second control terminal connected with the i-th second gate line, the first input terminal connected with the j-th first data line, and the second input terminal connected with the j-th second data line;

wherein the first direction is perpendicular to the second direction, n and m are both integers greater than or equal to 1, i is an integer and $1 \leq i \leq n$, and j is an integer and $1 \leq j \leq m$.

14. The liquid crystal display panel according to claim 13, wherein the liquid crystal display panel further comprises:

a first gate driver configured to provide the first control signal for the n first gate lines;

a second gate driver configured to provide the second control signal for the n second gate lines;

a first data driver configured to provide the first input signal for the m first data lines; and a second data driver configured to provide the second input signal for the m second data lines.

15. A driving method for the memory-in-pixel circuit according to claim 1, comprising:

applying the first control signal to the first control terminal;

while the first control signal is active, applying the first input signal to the first input terminal and applying the second input signal to the second input terminal to make the third node or the fourth node at an active potential;

applying the second control signal to the second control terminal, and while the first control signal is inactive and the second control signal is active, bringing one of the first input terminal and the second input terminal into conduction with the output terminal according to the potential of the third node and the fourth node.

16. The driving method according to claim 15, wherein while the first control signal is active, one of the first input signal and the second input signal is at an active potential, and the other thereof is at an inactive potential.

* * * * *